(12) United States Patent
Weinert et al.

(10) Patent No.: US 10,450,866 B2
(45) Date of Patent: Oct. 22, 2019

(54) ROTOR DEVICE OF AN AIRCRAFT ENGINE WITH A DAMPING DEVICE BETWEEN TURBINES BLADES

(71) Applicant: Rolls-Royce Deutschland Ltd & Co KG, Blankenfelde-Mahlow (DE)

(72) Inventors: Markus Weinert, Rangsdorf (DE); Tobias Leymann, Berlin (DE)

(73) Assignee: ROLLS-ROYCE DEUTSCHLAND LTD & CO KG, Blankenfeld-Mahlow (DE)

( * ) Notice: Subject to any disclaimer, the term of this patent is extended or adjusted under 35 U.S.C. 154(b) by 456 days.

(21) Appl. No.: 15/216,935

(22) Filed: Jul. 22, 2016

(65) Prior Publication Data

US 2017/0022819 A1    Jan. 26, 2017

(30) Foreign Application Priority Data

Jul. 24, 2015 (DE) .................. 10 2015 112 144

(51) Int. Cl.
*F01D 5/10* (2006.01)
*F01D 5/22* (2006.01)
(Continued)

(52) U.S. Cl.
CPC .............. *F01D 5/10* (2013.01); *F01D 5/12* (2013.01); *F01D 5/22* (2013.01); *F01D 5/3007* (2013.01);
(Continued)

(58) Field of Classification Search
CPC ..... F01D 5/10; F01D 5/12; F01D 5/22; F01D 5/3007; F01D 11/006; F01D 5/26
See application file for complete search history.

(56) References Cited

U.S. PATENT DOCUMENTS 3,112,915 A   12/1963   Drew et al.
5,302,085 A   4/1994    Dietz et al.
(Continued)

FOREIGN PATENT DOCUMENTS

EP        1867836 A2      12/2007
WO    WO2014070695 A1     5/2014

OTHER PUBLICATIONS

German Search Report dated May 31, 2016 from counterpart German App No. 10 2015 112 144.1.
(Continued)

*Primary Examiner* — Woody A Lee, Jr.
*Assistant Examiner* — Sabbir Hasan
(74) *Attorney, Agent, or Firm* — Shuttleworth & Ingersoll, PLC; Timothy J. Klima

(57) ABSTRACT

A rotor of an aircraft engine includes a disk wheel and at least two turbine blades. A damping device is arranged below a blade platform and inside a cavity between the blades in the radial direction. The cavity is formed by a respective recess at adjoining blades, with respective recesses having an outer guide surface in the radial direction, acting together with the damping device during operation of the rotor. The guide surface extends radially, from the lateral edge area of the blade to the central area of the blade. The respective recess extends circumferentially from a boundary plane defined by the lateral edge area of the blade to a side surface that delimitates the guide surface towards the blade center. The recess of at least one of the adjacent blades completely receives the damping device.

15 Claims, 7 Drawing Sheets

(51) Int. Cl.
*F01D 11/00* (2006.01)
*F01D 5/12* (2006.01)
*F01D 5/30* (2006.01)

(52) U.S. Cl.
CPC ........ *F01D 11/006* (2013.01); *F05D 2220/32* (2013.01); *F05D 2240/24* (2013.01); *F05D 2250/314* (2013.01); *F05D 2260/30* (2013.01); *F05D 2260/96* (2013.01); *Y02T 50/671* (2013.01)

(56) References Cited

U.S. PATENT DOCUMENTS

| | | | | |
|---|---|---|---|---|
| 7,534,090 | B2* | 5/2009 | Good | F01D 5/10 |
| | | | | 415/119 |
| 8,137,072 | B2* | 3/2012 | Kim | F01D 5/22 |
| | | | | 416/190 |
| 2005/0079062 | A1 | 4/2005 | Surace et al. | |
| 2010/0111700 | A1 | 5/2010 | Kim et al. | |

OTHER PUBLICATIONS

European Search Report dated Dec. 16, 2016 for counterpart European Application No. 16176172.1.

\* cited by examiner

ROTOR DEVICE OF AN AIRCRAFT ENGINE WITH A DAMPING DEVICE BETWEEN TURBINES BLADES

This application claims priority to German Patent Application DE102015112144.1 filed Jul. 24, 2015, the entirety of which is incorporated by reference herein.

The invention relates to a rotor device of an aircraft engine with a damping device between the turbine blades of a disk wheel according to the kind as it is described in more detail herein.

Rotor devices of jet engines as they are known from practice have a disk wheel and a set of structurally identical turbine blades per turbine stage, which are arranged with profiled blade roots inside retention slots that are arranged at the circumferential side at the disk wheel and are mostly embodied in the axial direction. Connecting to the blade roots of the turbine blades outward in the radial direction of the rotor device are respectively a blade platform and a blade airfoil.

In order to reduce oscillations or vibrations that occur in the turbine blades during operation of a jet engine, it is known to respectively arrange a damper element between the blade platforms of two turbine blades that are arranged adjacent to each other in the circumferential direction of the rotor device below the blade platforms inside cavities or damper pockets provided for this purpose, whereby damping of blade vibrations is achieved my means of friction. In practice, the damper elements that are also referred to as inter platform dampers mostly have a roof-shaped area in cross-section and abut with their contact surfaces at corresponding surfaces of recesses that are provided at two adjacent turbine blades and form the damper pockets.

What is problematic here during mounting and dismounting of the blade set with the disk wheel is that usually only the complete blade set can be inserted into the disk wheel in a spiral-like manner, wherein the arrangement of the damper elements inside the damper pockets between the turbine blades is difficult.

During mounting, the damper elements are first fixated at the assigned turbine blade for example by using grease or an adhesive in order to prevent the damper elements from falling during mounting. Subsequently, the turbine blades are at first inserted only slightly into the retention slots of the disk wheel respectively provided for receiving them, so that they can still be moved or tilted to a small degree in the circumferential direction. At that, the turbine blade that is respectively adjacent in the circumferential direction of the rotor device is also slightly inserted into the respective reception rail of the disk wheel, wherein the movement range of the turbine blades with respect to each other in the circumferential direction has to be made use of in order to avoid that the damper element arranged between them is detached from the turbine blade to that it is fixated on by the subsequently mounted turbine blade, and falls out. In a comparable manner, all turbine blades are successively first inserted slightly into the respective retention slot of the disk wheel and are subsequently completely inserted into the respective reception rail or disk groove with a spiral-like movement.

The axial movement of individual blades can be realized in particular in blades without a cover band segment, just as long as that is not restricted by inter platform damping elements. This requires a special mounting or disassembly procedure with special tools and does not allow for any exchange of individual turbine blades without having to disassembly the entire blade set. Since mounting or disassembly occasionally has to be performed several times, for example for balancing, installing or uninstalling the turbine blades is disadvantageously very time-consuming.

Apart from the expenditure of time and the additionally required tools, grease or adhesive residue is also disadvantageous, since it can contribute to the reduction of the blade's and possibly also the disk's service life.

Thus, it is the object of the present invention to provide a rotor device which is easier and quicker to mount and dismount as compared to known rotor devices.

This object is achieved with a rotor device having features as disclosed herein.

This relates to a rotor device of an aircraft engine with a disk wheel and at least two turbine blades that are arranged thereat and that are adjacent to each other, and with at least one damping device that in operation is arranged below a blade platform of the turbine blades and inside a cavity between the turbine blades in the radial direction and at least in certain areas in the circumferential direction of the rotor device, wherein the respective cavity is formed by a recess at the adjoining turbine blades, wherein each of the recesses has an outer guide surface as viewed in the radial direction of the rotor device, which acts together with the damping device during operation of the rotor device, wherein the respective guide surface extends radially in the direction of the disk wheel, beginning at a, with respect to the circumferential direction of the rotor device, lateral edge area of the turbine blade towards a central area of the turbine blade, and wherein the respective recess extends in the circumferential direction of the rotor device from a boundary plane defined by the lateral edge area of the turbine blade to a side surface that delimitates the guide surface towards the turbine blade center.

According to the invention, it is suggested that the recess of at least one of the adjoining turbine blades that is delimited by the guide surface, the boundary plane and the side surface is configured to completely receive the damping device.

A rotor device that is embodied according to the invention can be easily and quickly mounted or dismounted as compared to known rotor devices, for example also during the balancing procedure. Mounting and dismounting is particularly facilitated due to the fact that during mounting or disassembly the damping device can be temporarily arranged in its entirety with respect to the radial direction of the rotor device below the blade platform inside the recess of one of the turbine blades that form the damper pocket.

Accordingly, the recess at one of two adjacent turbine blades for receiving the damping device during mounting has a width in the circumferential direction of the rotor device, which in this cross-section is equal to or larger than a width of the damping device in the circumferential direction of the rotor device, wherein the recess is preferably wider than the damping device by desired tolerances.

Thus, on the side that is concave or convex depending on the design of the turbine blade, deeper damper pockets are used in the circumferential direction, allowing for the damping device to be completely or almost completely countersunk in the assigned recess of the turbine blade during mounting, so that the individual turbine blades of the rotor device can be pushed into the matched retention slot of the disk wheel bit by bit, without the danger of the damping device wedging or jamming. Subsequently, the damping devices can be shifted into a central position, if necessary. During operation, the damping devices advantageously center themselves due to the centrifugal force present between the turbine blades.

Thanks to the invention, the time required for the mounting process can be shortened, and additional complex mounting tools are also rendered unnecessary for mounting the damping devices between the individual turbine blades.

Further, the invention has the advantage that more elaborate forms of damper elements are possible. In this manner, the secondary air system as well as the blade platform cooling efficiency can for example be improved depending on the chosen design.

The design of the recesses at the turbine blades according to the invention ultimately also leads to an advantageous weight reduction of the turbine blades.

In an advantageous embodiment of a rotor device according to the invention, a securing device can be provided that, in the mounted state of the damping device, is arranged below the damping device at least in certain areas as viewed in the radial direction of the rotor device. The securing device delimitates the recess inwardly in the radial direction of the rotor device at least in certain areas. Here, the securing device forms a locating surface for the damping device and restricts the movement of the damping device inwardly in the radial direction of the rotor device at least in certain areas, so that any undesired movement of the damping device inside the recess or its falls out is avoided.

By providing the securing device, adhesive or grease is advantageously no longer necessary during mounting for fixating the damping devices at the assigned turbine blades, whereby the negative effects of adhesive or grease residues on the service life of the blade material is avoided.

Preferably, the securing device has two securing elements, of which one is arranged in the axial direction of the rotor device in a front area of the turbine blade and another in the axial direction of the rotor device in a rear area of the turbine blade.

In a particularly simple embodiment of the invention, at least one part of the securing device is formed by one of the turbine blades. However, alternatively or in addition to this it can also be provided that at least one part of the securing device is a separate structural component that can be brought into operative connection with one of the turbine blades.

In particular in the axial direction of the rotor device, the recess of the turbine blade has a length that substantially corresponds to the axial extension of the damping device, wherein the recess can respectively be delimitated by a wall area of the turbine blade in particular in the axial direction of the rotor device. A position of the damping device inside the recess can be defined in the axial direction of the rotor device in a simple manner through a respective arrangement of the wall areas, so that a desired damping effect and/or sealing effect can be achieved.

In a preferred embodiment of the invention, the damping device has a roof-like or roof-shaped area with two active surfaces in cross-section as viewed in the circumferential direction of the rotor device, wherein respectively one active surface acts together with one of the guide surfaces of the turbine blades during operation of the rotor device. In cross-section between the active surface of the damping device and the respective guide surface of the recess, preferably a line contact and on the whole a surface contact is present during operation of the rotor device, wherein a damping effect is optimized in this way.

Tests concerning the damping and/or sealing effect of the damping device have shown it to be advantageous if the active surfaces of the damping device together enclose an angle of approximately 120° in cross-section. Other designs of the damping device cross-section are possible depending on the application requirements.

Tests have shown that a good damping and sealing effect can be achieved through the damping device if the guide surface is embodied so as to be straight in a section as viewed in the circumferential direction of the rotor device, wherein the guide surface in cross-section can enclose an angle of preferably approximately 30° together with a tangent to the circumferential direction of the rotor device.

If the guide surface of the recess of the turbine blade has a larger radial extension in a first end area that is oriented in the axial direction of the rotor device than in a second end area that is arranged opposite the first end area, it can be ensured in a simple manner that during operation of the rotor device the damping device is moved in the direction of the end area, in which the guide surface has the largest radial extension. In this way, sealing in this end area can be improved in a simple manner.

In an advantageous embodiment of the rotor device according to the invention, it can be provided that the guide surface of the recess of the turbine blade and/or the damping device can be embodied so as to be straight as well as to be bent in the axial direction of the rotor device. The damping device can be designed flexibly with regard to its shape, so that the damping device can be embodied in a simple manner according to the requirements to be met.

A width of the damping device and/or a width of the recess can be substantially constant or can vary in the axial direction of the rotor device as viewed in the circumferential direction of the rotor. This has the advantage that damping devices that are embodied in a simple manner as well as damping devices that are embodied in a complex manner can be used in a rotor device according to the invention.

Further, it can be provided that at least one side surface of the damping device and/or the side surface of the recess is embodied so as to be straight or bent with respect to the axial direction of the rotor device, which in turn also allows for a high degree of freedom in designing the damping device. Here, the respective side surfaces can for example be bent in an S-shaped or parabolic manner, wherein the curvature of the respective side surface can be provided in the radial direction and/or in the circumferential direction of the rotor device as viewed in the axial direction of the rotor device.

If the side surface or lateral wall of the recess of the turbine blade at least approximately corresponds to the shape of a side surface of the damping device that is facing towards it during operation in the axial direction of the rotor device, a distance between the damping device of the lateral wall of the recess is substantially constant in the axial direction of the rotor device during operation of the rotor device.

The rotor device according to the invention can be used in any area of engines, wherein the rotor device is preferably a part of any stage of a turbine of the engine.

The features specified in the patent claims as well as the features specified in the following exemplary embodiments of the rotor device according to the invention are respectively suitable on their own or in any combination with each other to further develop the subject matter according to the invention.

Further advantages and advantageous embodiments of a rotor device according to the invention follow from the patent claims and the exemplary embodiments that are described in principle in the following by referring to the drawing, wherein, with a view to clarity, the same reference numbers are respectively used for structurally and functionally identical components.

Herein:

Figure 1:
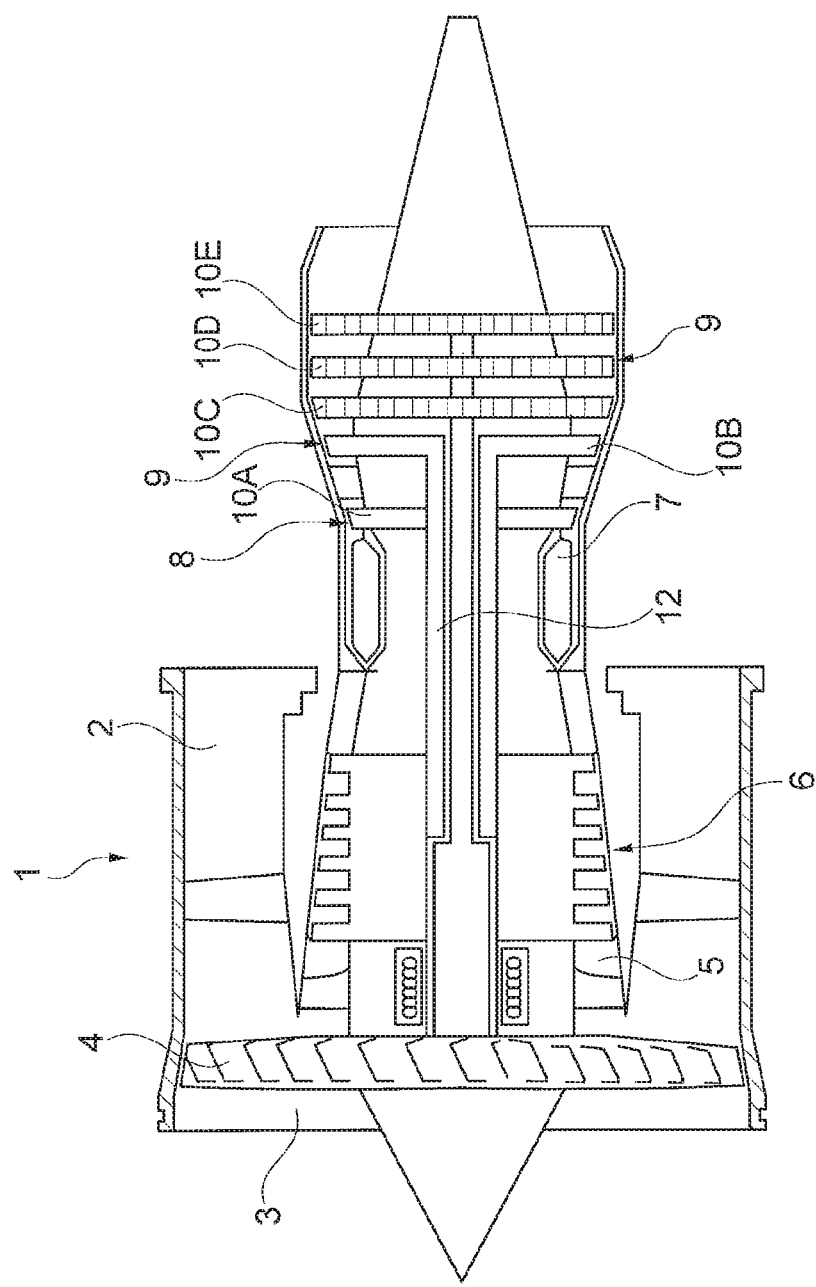
FIG. 1 shows a strongly schematized longitudinal section view of a jet engine that has a turbine with multiple rotor devices.

FIG. 1 shows an aircraft engine or jet engine 1 in a longitudinal section view, wherein the jet engine 1 is embodied with a bypass channel 2 and an inlet area 3. Downstream, a fan 4 connects in a per se known manner to the inlet area 3. Downstream of the fan 4, the fluid flow inside the jet engine 1 is split up into a bypass flow and a core flow, wherein the bypass flow flows through the bypass channel 2 and the core flow flows into an engine core 5, which in turn is embodied in a per se known manner with a compressor device 6, a burner 7, a high-pressure turbine 8 and a low-pressure turbine 9.

In the present case, the entire turbine is embodied in a multi-stage manner as a two-stage axial-flow high-pressure turbine 8 and three-stage axial low-pressure turbine 9 with rotor devices 10A, 10B, 10C, 10D, 10E, which substantially have a comparable structure.

But other than that the turbine can principally have any number of rotor devices. Apart from the shown embodiment with two shafts, an engine with three shafts can also be provided that comprises a low-pressure turbine as well as a medium-pressure and high-pressure turbine.

Figure 2:
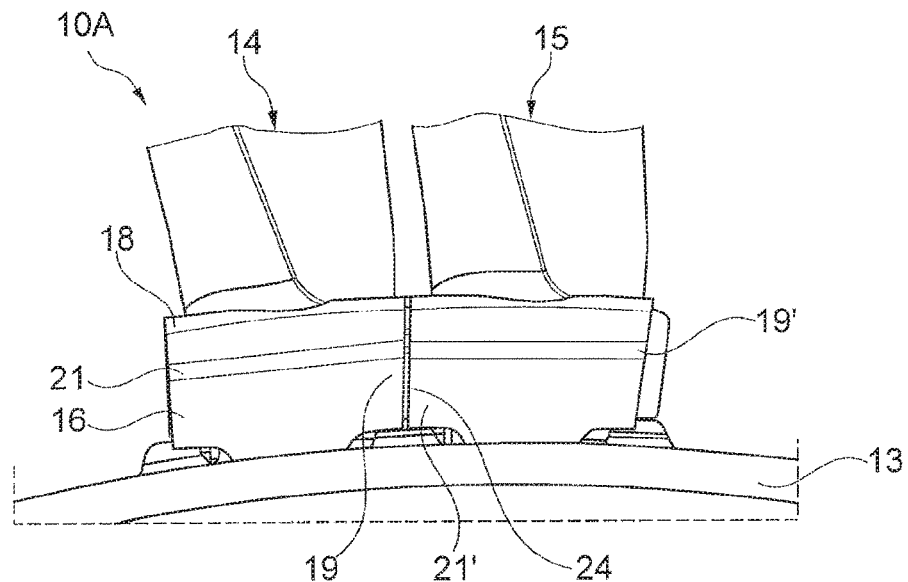
FIG. 2 shows a simplified front view of a rotor device according to FIG. 1 alone, wherein a disk wheel with two turbine blades arranged thereat and a damping device that acts together with two adjacent turbine blades can be seen.
Figure 3:
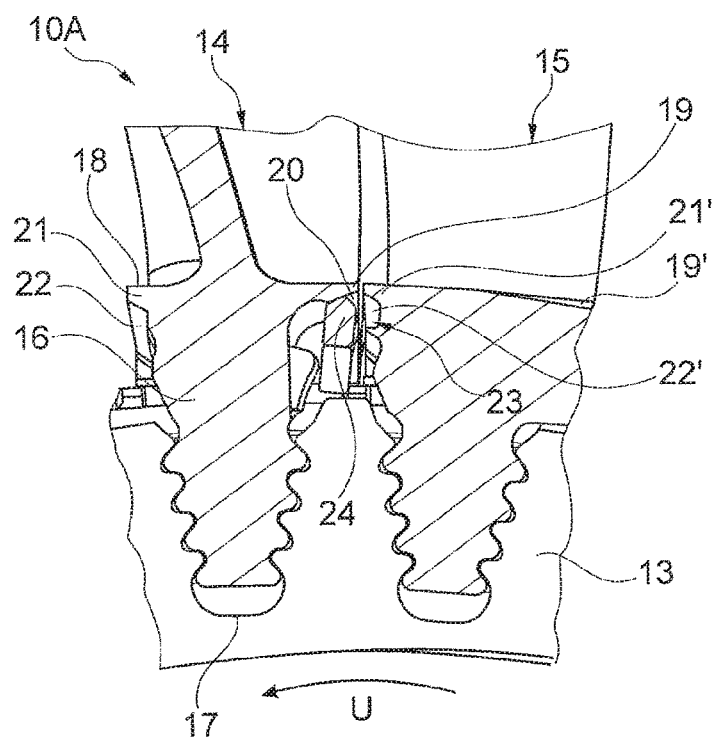
FIG. 3 shows a simplified view of a section through the rotor device according to FIG. 2, wherein the damping device is shown in a mounting position for mounting the turbine blades at the disk wheel.
Figure 4:
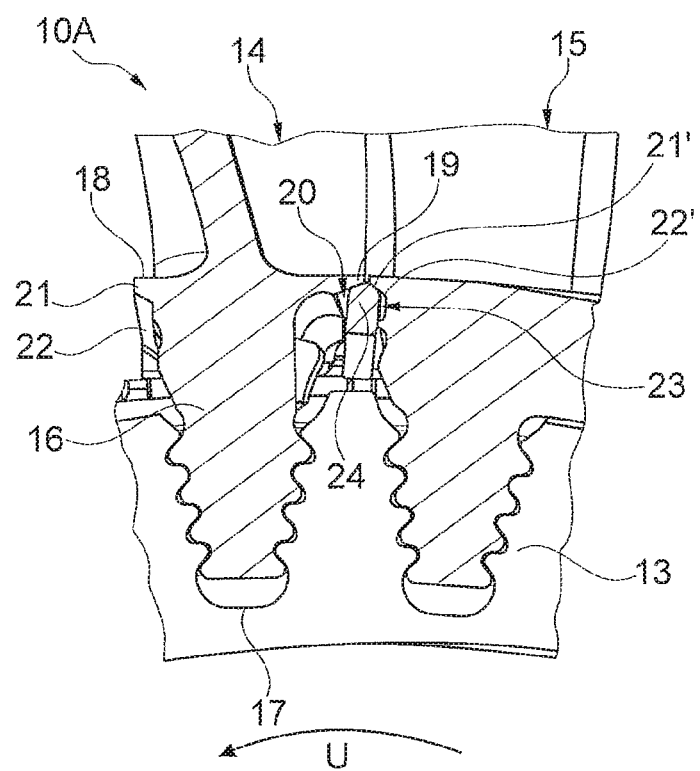
FIG. 4 shows a sectional view of the rotor device corresponding to FIG. 3, wherein the damping device is shown in a position during the operation of the rotor device or of the jet engine.

FIG. 2 to FIG. 4 show a section of the exemplarily described rotor device 10A alone, which forms a first stage of the high-pressure turbine 8. The rotor device 10A is embodied with a disk wheel 13 which is centrally arranged and connected to a high pressure shaft 12, an on which a plurality of turbine blades 14, 15 is arranged in the radially outer areas at the circumferential side, with FIG. 2 to FIG. 4 showing two of the turbine blades 14 and 15 that are arranged so as to be adjacent in the circumferential direction U of the rotor device 10A. In the present case, the turbine blades 14, 15 are embodied in a structurally identical manner and respectively have a blade root 16 that can be seen in more detail in FIG. 3 and FIG. 4 and that is formed as a fir-tree root, via which the turbine blades 14, 15 are respectively arranged in the known manner inside the reception areas 17 of the disk wheel 13 that extend inside the disk wheel 13 and correlate with the fir-tree-shaped blade roots 16, wherein the reception areas 17 substantially extend in the defined profile in the axial direction A of the rotor device 10A or the jet engine 1.

As can be seen in FIG. 3 and FIG. 4, the turbine blades 14, 15—as viewed in the radially outward direction R of the rotor device 10A—are embodied below the blade platforms 18 with a recess 20 in a first edge area 19, 19' that is oriented in the circumferential direction U of the rotor device 10A, and with a further recess 22, 22' in a second edge area 21, 21' that is facing away from the first edge area 19, 19' in the circumferential direction U of the rotor device 10A, wherein the recess 20 of the turbine blade is facing towards the further recess 22' of the turbine blade 15 in a state of the turbine blades 14, 15 14 in which they are mounted at the disk wheel 13.

The adjoining recesses 20, 22' of the adjacent turbine blades 14, form a cavity 23, which is also referred to as a damper pocket. Inside the cavity 23, a damping device 24, a so-called inter platform damper, is arranged. The damping device 24 is provided in order to damp the oscillations and/or vibrations of the turbine blades 14, 15 that occur during operation of the rotor device 10A or the jet engine 1 in particular in the radial direction R of the rotor device 10A, and that may for example be induced by turbine blades that are arranged upstream of the turbine blades 14, 15, and thus to reduce amplitudes of oscillation and optimize resonance frequencies.

Besides the damping of oscillations and vibrations, a secondary air system and a blade platform cooling efficiency can also be improved as the damping device 24 avoids a line of sight or a gap between the disk wheel 13 and the respective turbine blade 14 or 15, or as an entry surface is reduced. Principally, also a gap between two adjacent turbine blades can be sealed and the overall level of efficiency of the jet engine 1 can be optimized with the damping device 24.

In FIG. 2 and FIG. 4, the damping device 24 can respectively be seen in a position during operation of the jet engine 1, wherein the damping device 24 is centered between the recess 20 of the first turbine blade 14 and the further recess 22' of the adjoining turbine blade 15 by the centrifugal force that is acting in the circumferential direction U of the rotor device 10A.

FIG. 3 shows the damping device 24 in a mounting position, in which the turbine blades 14, 15 can be mounted at the disk wheel 13 in a simple and quick manner. Here, the damping device 24 is arranged completely inside the recess 20 of the first turbine blade 14, so that the turbine blades 14, 15 can be inserted into the respective reception areas 17 of the blade wheel device 13 without being obstructed by the damping device 24.

The underlying mechanism will be explained in more detail below by referring to the detailed views in FIG. 5 to FIG. 8.

Figure 5:
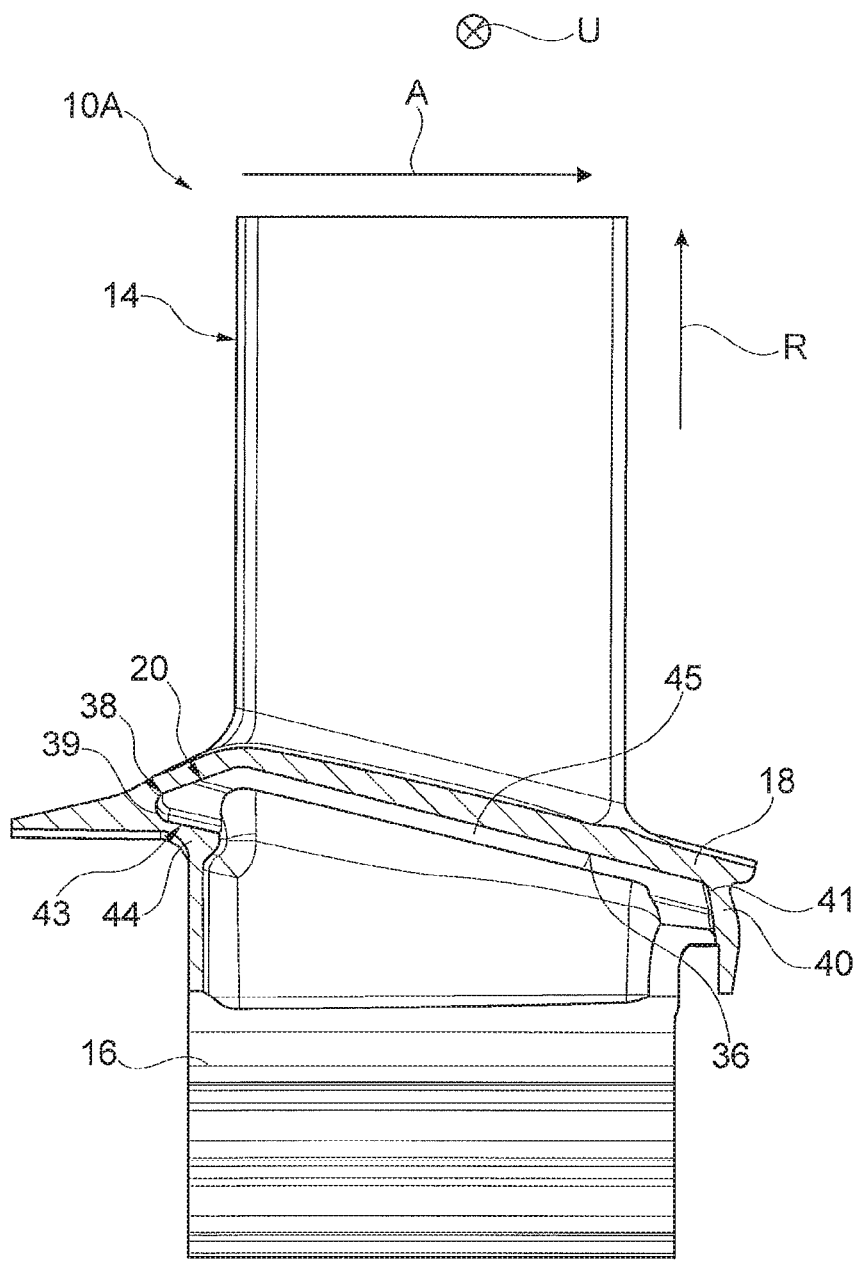
FIG. 5 shows a simplified side view of a section of an alternatively embodied turbine blade alone, wherein a recess that is provided for the arrangement of a damping device and for forming a damper pocket can be seen.
Figure 6:
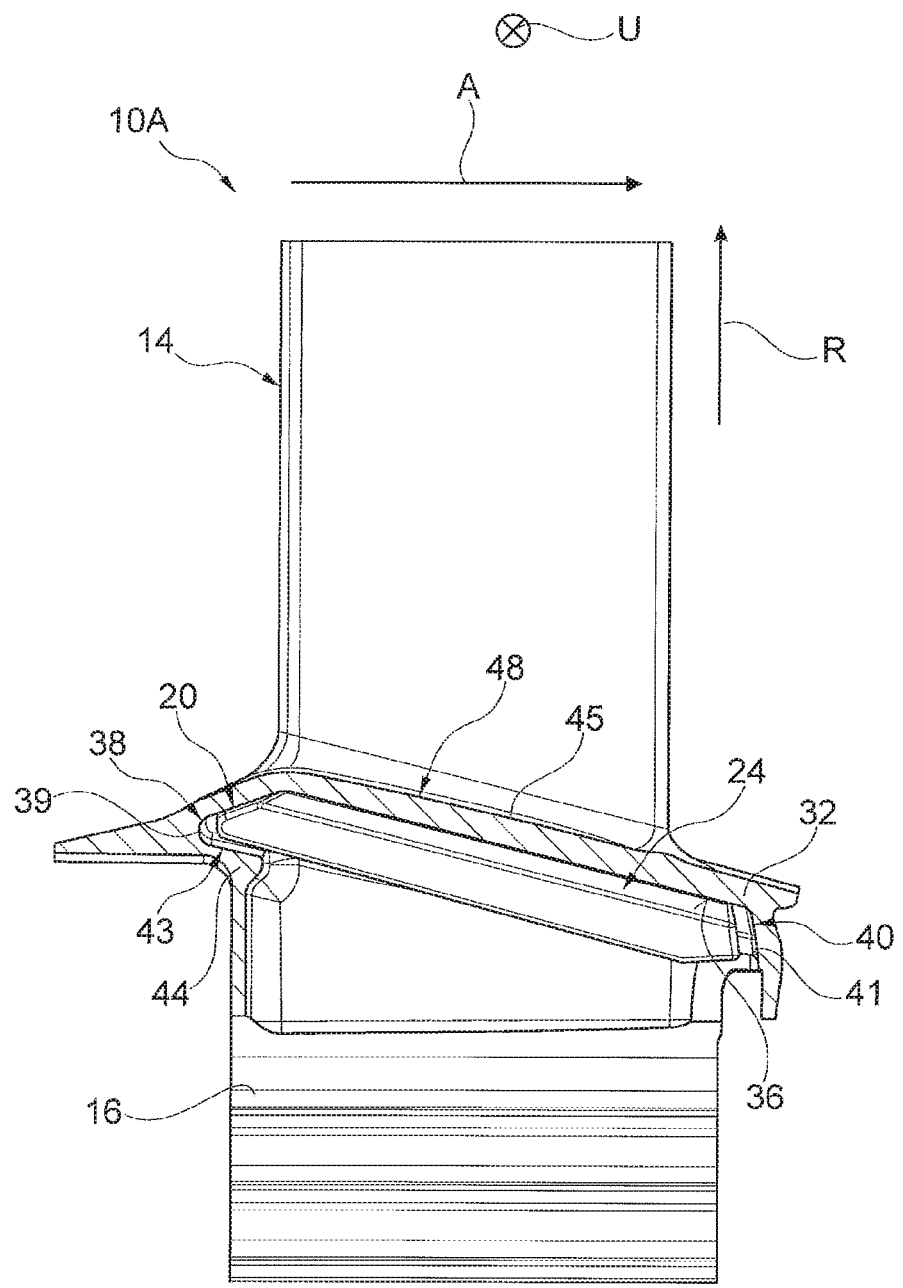
FIG. 6 shows a view of the turbine blade corresponding to FIG. 5 with a damping device that is arranged inside the recess, wherein the damping device is shown in a position which it takes as the turbine blades are mounted at a disk wheel.

In FIG. 5 and FIG. 6, respectively one side view of the first turbine blade 14 of the rotor device 10A is shown, which has a recess 20 below the blade platform 18 in the radial direction R of the rotor device 10A, with the recess being embodied—as can be seen in FIG. 6—for complete arrangement of the damping device 24 during mounting. Outwardly in the radial direction R of the rotor device 10A, the recess 20 is delimitated by a guide surface 36 that can in particular be seen in FIG. 7 and FIG. 8 and that in the present case is embodied so as to be substantially planar. In the cross-section according to FIG. 7 and FIG. 8, the guide surface 36 is tilted with respect to a tangent T1 to the circumferential direction U of the rotor device 9 in the area of the first edge area 19 of the turbine blade 14 by an angle 46 of in the present case approximately 30°, namely in such a manner that the guide surface 36 extends in a continuously tilted manner radially in the direction of the blade root 16, from the first edge area 19 in the direction of an area 37 of the turbine blade 14 that is central in the circumferential direction U.

In the axial direction A of the rotor device 10A, the recess 20 is delimited by a first wall 39 in a first axial end area 38 and by a second wall 41 in a second axial end area 40 that is arranged opposite the first axial end area 38. In the present case, the recess 20 is slightly longer than the blade root 16 in the axial direction A of the rotor device 10A.

Further, a securing device 43 is provided via which the damping device 24 is secured against an inward movement in the radial direction R of the rotor device 29. In the present case, the securing device 43 has a wall 44 in the first axial end area 38 against which the damping device 24 rests, for example if it is in its mounting position according to FIG. 6. In the present case, the wall 44 is part of the first turbine blade 14 and is formed integrally with the same. The securing device 43 is formed in the area of the second axial end area 40 by a device for securing the turbine blade 30 in the axial direction A of the rotor device 10A, which is not shown here in any more detail and which acts together with the turbine blade 14 in the area of a groove. The damping device 24 rests on the tilted device in the mounting position in the second axial end area 40, so that a movement of the damping device is restricted in the radial direction R of the rotor device 10A.

In the circumferential direction U of the rotor device 10A, the recess 20 is delimited by a side surface 45 which directly adjoins the guide surface 36. Here, the side surface 45 extends in the axial direction A of the rotor device 10A or of the jet engine 1 across the entire length of the recess 20.

Figure 7:
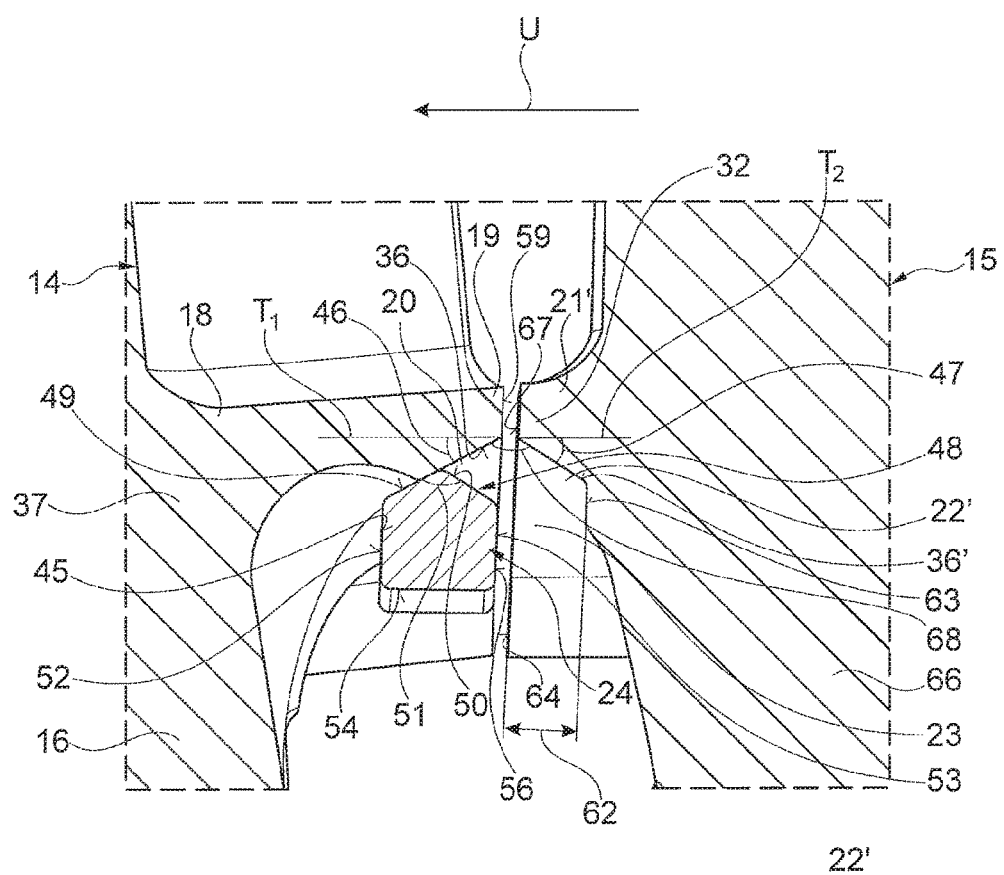
FIG. 7 shows a simplified sectional view of a section of two turbine blades that are arranged at a disk wheel, wherein the damping device is shown in the mounting position.
Figure 8:
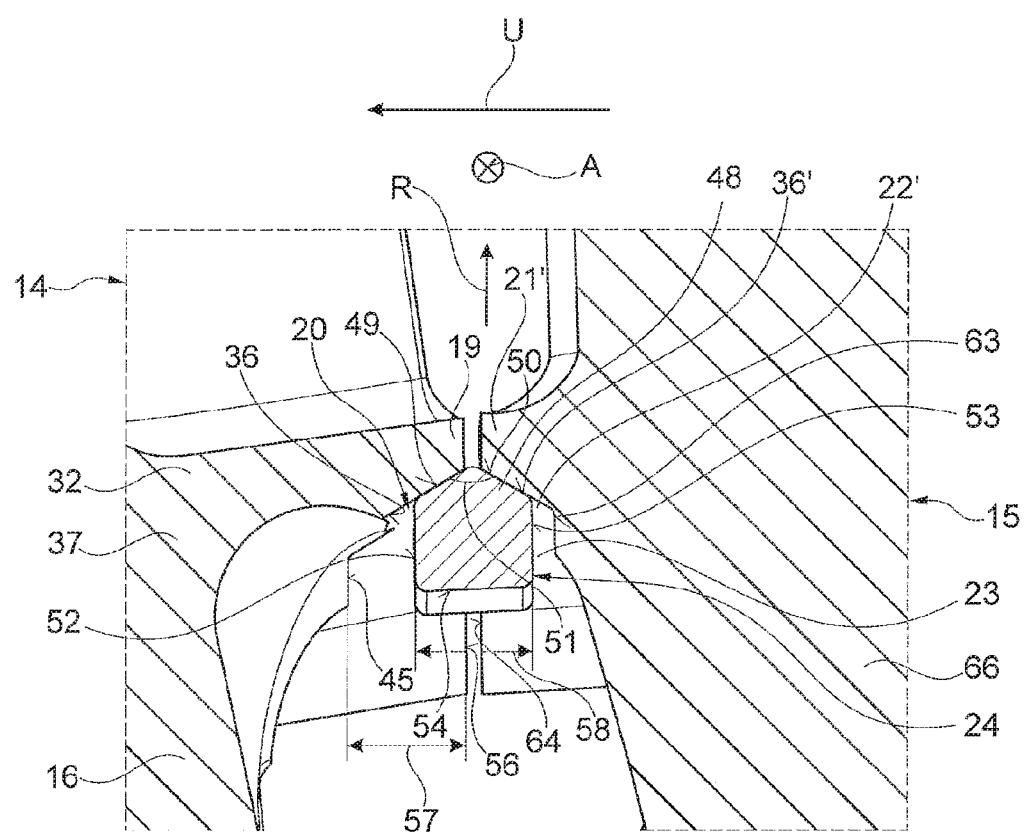
FIG. 8 shows a view of the turbine blades corresponding to FIG. 7, wherein the damping device is shown in a position during operation of the rotor device.

As can be clearly seen in cross-sectional view according to FIG. 7 and FIG. 8, the damping device 24, which in the present case is shown in a simplified manner, has a roof-like or roof-shaped area 48 that is oriented outward in the radial direction R of the rotor device 29 and that is embodied with two active surfaces 49, 50. In the present case, the active surfaces 49 and 50 are respectively embodied so as to be substantially planar in the axial direction A in the mounted state of the damping device 24, wherein the active surfaces 49, 50 together form an angle 51 of in the present case approximately 120°. Here, a first active surface 49 of the damping device 35 is provided for acting together with the guide surface 36 of the recess 20.

In the present case, the damping device 24 further has two side surfaces 52, 53, of which one first side surface 52 is facing towards the side surface 45 of the recess 20 in the mounted state of the damping device 24. In an area that is oriented inward in the radial direction R of the rotor device 29, the damping device 24 is delimited by a base surface 54, with which the damping device rests on the wall 44 and if necessary on the device of the securing device 43 in the mounting position.

With respect to the respective shapes, the damping device 24 and the recess 20 of the first turbine blade 14 are adjusted to each other in such a manner that the damping device 24 according to FIG. 7 can be arranged completely inside the recess 20 for mounting the rotor device 10A. Here, the recess 20 is delimited by the guide surface 36 outwardly in the radial direction R of the rotor device 29, and inward by the securing device 43, in an axially inward orientation by the first wall 39 and the second wall 41, and in the circumferential direction U of the rotor device 10A on the one hand by the side surface 45 and on the other hand by a boundary surface or plane 56 that defines a lateral boundary surface of the first edge area 19 of the first turbine blade 14 towards the second turbine blade 15.

Here, a width 57 of the lateral flank or recess 20 is larger in every cross-section than the respective width 58 of the damping device 24, or is equal to the width 58 of the damping device 24, wherein the width 57 of the recess 20 is larger than the width 58 minus the minimally occurring intermediate platform gap 59 in the circumferential direction of the damping device 24 by a value that corresponds to the desired tolerances. Thus, the width 58 of the damping device 24 is smaller than the width of the lateral flank or recess 20 plus the width of the gap 59 and the given tolerances. In the present case, the damping device 24 as well as the recess 20 have a substantially constant width 57 or 58 in the axial direction A of the rotor device 10A, wherein the first side surface 52 of the damping device 24 and the side surface 45 of the recess 20 are located in planes that extend substantially in parallel to each other, extending in the axial direction A and in the radial direction R of the rotor device 10A.

It can be seen in FIG. 7 and FIG. 8 that in the present case the recess 22' of the adjoining second turbine blade 15 which adjoins the recess 20 of the first turbine blade 14 and forms the cavity 23 or the damper pocket has a width 62 in the circumferential direction U that is smaller than the width 57 of the recess 20 of the first turbine blade 14. In a manner comparable to the recess 20 of the first turbine blade 14, the width 62 of the further recess 22' of the second turbine blade 15 is defined by a side surface 63 and an edge surface or boundary plane 64 that defines a planar lateral boundary surface of the blade platform of the second turbine blade 15 towards the first turbine blade 14, in a manner comparable to the boundary plane 56 of the first turbine blade 14.

Corresponding to the recess 20 of the first turbine blade 14, the further recess 22' of the second turbine blade 15 also has a guide surface 36' that is embodied in a planar manner and that is configured for acting together with the second active surface 50 of the damping device 24. Together with the guide surface 36 of the first turbine blade 14, the guide surface 36' of the second turbine blade 15 forms a contour in the kind of a slanted roof, with the guide surface 36' of the second turbine blade 15 being slanted from the edge area 21' into the direction of a central area 66 of the turbine blade 15 for this purpose. In the area of its second edge area 21' that is facing towards the first turbine blade 14, the guide surface 36' of the second turbine blade 15 is also tilted in its cross-section according to FIG. 7 and FIG. 8 by an angle 47 of approximately 30° with respect to a tangent T2 to the circumferential direction U. Thus, the guide surfaces 36, 36' of the recesses 20, 22' that form the damper pocket 23 together enclose an angle 68 of approximately 120°.

For mounting the rotor device 10A, the damping device 24 is first brought into its mounting position according to FIG. 6 and FIG. 7, in which the damping device 24 is arranged completely inside the recess 20 of the first turbine blade 14. In this manner it is ensured that the turbine blades 14, 15 can be inserted independently of each other into the reception areas 17 of the disk wheel 13 substantially in the axial direction A of the rotor device 10A, without the damping device 24 coming into contact with the adjoining turbine blade 15. Here, the securing device 43 secures the damping device 24 inwardly in the radial direction R of the rotor device 10A, and any wedging of the damping device 24 is safely avoided during mounting. After the turbine blade 14, all further turbine blades that are also respectively provided with a damping device 24 can be respectively separately inserted into the respectively provided reception areas 17 of the disk wheel 13. At that, the use of a tool is advantageously rendered unnecessary.

During operation of the rotor device 10A or the jet engine 1, the centrifugal force moves the damping device 24 with its first active surface 49 along the guide surface 36 of the recess 20 of the first turbine blade 14 in the direction of its edge area 19, until the damping device 24 abuts the guide surface 36' of the adjoining recess 22' of the adjacent turbine blade 15 in addition also with its second active surface 50, and the damping device 24 is centered inside the recesses 20 and 22'. When the rotor device 10A is idle, i.e. if the centrifugal force acting on the damping device 24 is not sufficiently high, it falls radially downward or inward, so that the damping device rests on the securing device 43 of the first turbine blade 14 and a comparable securing device of the adjoining turbine blade 15.

Due to the fact that the recesses 20 and 22' respectively have a larger extension in the area of the first axial end area 38 than in the area of the second axial end area 40, the damping device 24 is additionally pressed in the direction of the first axial end area 38 by the centrifugal force that is acting on it during operation, so that a stronger sealing contact and in this way a good sealing effect can be achieved in this area as required.

PARTS LIST 1 aircraft engine
2 bypass channel
3 inlet area
4 fan
5 engine core
6 compressor device
7 burner
8 high-pressure turbine
9 low-pressure turbine
10A, 10B, 10C, 10D, 10E rotor device
12 high pressure shaft
13 disk wheel
14, 15 turbine blade
16 blade root
17 reception area
18 blade platform
19, 19' first edge area of the turbine blade
20 recess
21, 21' second edge area of the turbine blade
22, 22' further recess
23 cavity, damper pocket
24 damping device
36, 36' guide surface of the recess
37 central area of the turbine blade
38 first axial end area of the recess
39 first wall
40 second axial end area of the recess
41 second wall
43 securing device
44 wall
45 side surface of the recess
46 angle
47 angle
48 roof-shaped area of the damping device
49 first active surface of the damping device
50 second active surface of the damping device
51 angle
52 first side surface of the damping device
53 second side surface of the damping device
54 base surface of the damping device
56 edge level
57 width of the recess
58 width of the damping device
59 intermediate platform gap
62 width of the further recess
63 side surface of the further recess
64 edge level
66 central area of the turbine blade
68 angle
A axial direction
R radial direction
T1, T2 tangent
U circumferential direction

The invention claimed is:

1. A rotor device of an aircraft engine, comprising:
a disk wheel;
two turbine blades arranged on the disk wheel and adjoining each other, the two turbine blades including two blade platforms, one each respectively, and two recesses, one each respectively, the two recesses being positioned adjacent each other and radially below the two blade platforms,
the two recesses forming a cavity between the two turbine blades and radially below the two blade platforms,
a damping device that in operation is arranged inside the cavity between the two turbine blades in a radial direction and at least in certain areas in a circumferential direction of the rotor device,
wherein each of the two recesses includes respectively, an outer guide surface with respect to the radial direction, acting together with the damping device during operation of the rotor device,
wherein each outer guide surface extends radially in a direction of the disk wheel from a lateral edge area of the respective one of the two turbine blades as viewed in the circumferential direction of the rotor device to a central area of the respective one of the two turbine blades,
wherein each of the two recesses extends in the circumferential direction of the rotor device from a boundary plane defined by the respective lateral edge area to a respective side surface that delimits the outer guide surface in a direction toward a blade center of a respective one of the two turbine blades,
wherein at least one of the two recesses which is delimitated by the respective outer guide surface, the respective boundary plane and the respective side surface is configured for completely receiving the damping device;
wherein the respective outer guide surface of the at least one of the two recesses has a larger radial length in a first end area located in an axial direction of the rotor device than in a second end area of the at least one of the two recesses located opposite the first end area for completely receiving the damping device.

2. The rotor device according to claim 1, and further comprising a securing device including a wall for engaging the damping device, the securing device arranged below the damping device at least in certain areas as viewed in the radial direction when the damping device is mounted.

3. The rotor device according to claim 2, and further comprising at least one chosen from at least one part of the securing device being formed by at least one of the two turbine blades and at least one part of the securing device being a separate structural component, which can be brought into operative connection with at least one of the two turbine blades.

4. The rotor device according to claim 1, wherein the at least one of the two recesses has a length that substantially corresponds to an axial length of the damping device in an axial direction of the rotor device to completely receive the damping device.

5. The rotor device according to claim 1, wherein, in cross-section, the two active surfaces of the damping device together form an angle of 120° in a radially inward direction.

6. The rotor device according to claim 1, wherein at least one of the outer guide surfaces is straight in cross-section as viewed in the circumferential direction.

7. The rotor device according to claim 1, wherein, in cross-section, at least one of the outer guide surfaces forms an angle of 30° together with a tangent to the circumferential direction.

8. The rotor device according to claim 1, wherein at least one chosen from one of the respective outer guide surfaces and the damping device is straight in an axial direction of the rotor device.

9. The rotor device according to claim 1, wherein at least one chosen from a width of the damping device and a width of one of the two recesses is substantially constant as viewed in an axial direction of the rotor device.

10. The rotor device according to claim 1, wherein the damping device includes a side surface, and wherein at least one chosen from the side surface of the damping device and one of the respective side surfaces is straight with respect to an axial direction of the rotor device.

11. The rotor device according to claim 1, wherein the damping device includes a side surface, and wherein at least one of the respective side surfaces corresponds to a shape of the side surface of the damping device that faces the at least one of the respective side surfaces during operation.

12. The rotor device according to claim 1, wherein at least one chosen from one of the respective outer guide surfaces and the damping device is bent in an axial direction of the rotor device.

13. The rotor device according to claim 1, wherein at least one chosen from a width of the damping device and a width of one of the two recesses varies as viewed in an axial direction of the rotor device.

14. The rotor device according to claim 1, wherein the damping device includes a side surface, and wherein at least one chosen from the side surface of the damping device and one of the respective side surfaces is bent with respect to an axial direction of the rotor device.

15. A rotor device of an aircraft engine, comprising:
a disk wheel;
two turbine blades arranged on the disk wheel and adjoining each other, the two turbine blades including two blade platforms, one each respectively, and two recesses, one each respectively, the two recesses being positioned adjacent each other and radially below the two blade platforms,
the two recesses forming a cavity between the two turbine blades and radially below the two blade platforms,
a damping device that in operation is arranged inside the cavity between the two turbine blades in a radial direction and at least in certain areas in a circumferential direction of the rotor device,
wherein each of the two recesses includes respectively, an outer guide surface with respect to the radial direction, acting together with the damping device during operation of the rotor device,
wherein each outer guide surface extends radially in a direction of the disk wheel from a lateral edge area of the respective one of the two turbine blades as viewed in the circumferential direction of the rotor device to a central area of the respective one of the two turbine blades,
wherein each of the two recesses extends in the circumferential direction of the rotor device from a boundary plane defined by the respective lateral edge area to a respective side surface that delimits the outer guide surface in a direction toward a blade center of a respective one of the two turbine blades,
wherein at least one of the two recesses which is delimitated by the respective outer guide surface, the respective boundary plane and the respective side surface is configured for completely receiving the damping device;
wherein, in cross-section, the damping device includes an area with two active surfaces, where each of the two active surfaces is configured to act together with a respective one of the outer guide surfaces during operation of the rotor device;
wherein, in cross-section, the two active surfaces of the damping device together form an angle of 120° in a radially inward direction.

\* \* \* \* \*